Patented Apr. 6, 1954

2,674,632

UNITED STATES PATENT OFFICE 2,674,632

DEHYDROFLUORINATION OF 1,1-DIFLUOROETHANE

Benjamin F. Skiles, Wilmington, Del., assignor to E. I. du Pont de Nemours and Company, Wilmington, Del., a corporation of Delaware No Drawing. Application July 25, 1952, Serial No. 300,983

6 Claims. (Cl. 260—653)

This invention relates to a method for preparing vinyl fluoride by the dehydrofluorination of 1,1-difluoroethane over a novel and improved catalyst.

Vinyl fluoride is a valuable compound, particularly for the preparation of polymeric plastic materials and the like. It is known that vinyl fluoride can be manufactured by reacting acetylene with hydrogen fluoride in the presence of various catalysts. Considerable amounts of 1,1-difluoroethane are usually produced in such processes. While the 1,1-difluoroethane is a useful material, it is frequently desirable to convert it to vinyl fluoride.

It is an object of my invention to provide an improved method for producing vinyl fluoride from 1,1-difluoroethane. A further object is to provide a method for dehydrofluorinating 1,1-difluoroethane in the presence of a new catalyst whereby high yields of vinyl fluoride are obtained. Other objects are to advance the art. Still other objects will appear hereinafter.

The above and other objects may be accomplished in accordance with my invention which comprises heating a bed of a catalyst consisting essentially of aluminum sulfate to a temperature of from about 250° C. to about 400° C., flowing gaseous 1,1-difluoroethane through such bed at a rate of from about 20 to about 200 volumes of gaseous 1,1-difluoroethane per volume of catalyst per hour while maintaining the bed at a temperature of from about 250° C. to about 400° C.; and separating vinyl fluoride from the gaseous mixture leaving the bed.

I have found that aluminum sulfate is an excellent catalyst for dehydrofluorinating 1,1-difluoroethane to produce high yields of vinyl fluoride. Such catalyst is easy and relatively cheap to make and has an unusually long catalyst life.

The aluminum sulfate usually will be in the form of particles. Such particles may be in granular form produced by well known methods, as by carefully evaporating a solution of aluminum sulfate, heating the solid to give a porous friable anhydrous mass, crushing such mass and then screening the crushed material to obtain particles of the desired size, preferably 6 to 12 mesh. The particles may be in the form of pellets made by intimately mixing the aluminum sulfate with a binder, such as graphite, pressing into the form of pellets, and subsequently heating the pellets slowly in air. Also, such particles may be made by depositing the aluminum sulfate in well known manner on particles of a carbon support, such as charcoal and graphite. In accordance with well known principles, the particles should be sufficiently small to provide large surface areas for contact with the reactant gases, but ordinarily should not be so small as to unduly obstruct the passage of the gases therethrough or to be readily carried out of the reaction zone by the effluent gases. I have found particles of from about 3 mesh to about 12 mesh size to be quite satisfactory, and 6 to 12 mesh are preferred. The catalyst bed may be of the fluid bed type, if desired.

It would not be expected that HF or 1,1-difluoroethane would convert $Al_2(SO_4)_3$ to $AlF_3$ under the conditions of my process. However, when the aluminum sulfate is used for the dehydrofluorination of 1,1-difluoroethane, it apparently combines gradually with some of the HF liberated from the 1,1-difluoroethane. The nature of the reactions taking place and of the resulting products have not been fully determined, due to difficulty in obtaining an accurate analysis thereof, and the reactions are not understood. Analysis of the used catalyst indicates that it contains some inorganic fluorine and that its sulfur content is lowered. However, even after many hours of use, it still contains a considerable proportion of the sulfur, and its analysis does not correspond to that of a mixture of $AlF_3$ and $Al_2(SO_4)_3$. Accordingly, when the aluminum sulfate is used in my process for any appreciable period of time, it will contain some combined fluorine, and it will be understood that the resulting product is included within the scope of my invention and claims.

In the process of my invention, the aluminum sulfate catalyst is preferably employed in the form of a catalyst bed. Such catalyst bed is heated to a temperature of from about 250° C. to about 400° C. and such temperature is maintained while gaseous 1,1-difluoroethane is passed through it. Temperatures, materially below 250° C., result in uneconomically low conversions. Also, temperatures, above 450° C., result in reduced conversions and in carbonization. Optimum conversions and yields are obtained at temperatures of from about 350° C. to about 400° C., and such temperatures are preferred.

The gaseous 1,1-difluoroethane should be passed through the catalyst bed at a rate of from about 20 to about 200 volumes of gaseous 1,1-difluoroethane per volume of catalyst per hour. Lower rates unduly reduce the capacity of the reactor and are uneconomical. Higher rates result in excessive amounts of unreacted 1,1-difluoroethane in the effluent gases, and render the process uneconomical due to the cost of separating, recovering, and recycling such excess 1,1-difluoroethane. Preferably, the rate of flow of the mixture through the catalyst will be from about 20 to about 80 volumes of 1,1-difluoroethane per volume of catalyst per hour. I have found that from about 35 grams to about 40 grams of 1,1-difluoroethane per 400 cc. of catalyst per hour give quite satisfactory results.

Preferably, the reaction is carried out at atmospheric pressure. Elevated pressures may be used so long as the pressure is insufficiently high to liquefy either the reactants or the products. The practical upper limit is about 15 atmospheres.

The products of the reaction may be recovered in any conventional manner, such as by condensing the products and then fractionally distilling them to separate the components thereof. Preferably, when operating on a small scale, the gases are passed through an alkali solution to remove HF, then dried over calcium chloride, and the gas then condensed and fractionally distilled in a Podbielniak still. Any unreacted 1,1-difluoroethane may be returned to the reactor.

In order to more clearly illustrate my invention, preferred modes of carrying the same into effect, and the advantageous results obtained thereby, examples are given hereinafter. In such examples, the reactor was a black iron pipe 1 inch in diameter and 33 inches long placed in a vertical position in an electric furnace 30 inches long. The bed of catalyst was supported on a stainless steel screen and covered by stainless steel wool. Such bed was about 30 inches long and positioned in the heated portion of the reactor. The dehydrofluorinations were all carried out at atmospheric pressure. The product mixtures, containing vinyl fluoride, were all purified by washing with aqueous alkali and drying before analysis by fractionation.

*Example 1*

Water was added slowly to 454 g. of aluminum sulfate at 100° C. until a homogeneous solution was obtained. The solution was then slowly evaporated to dryness and heated to 650° C. in a furnace and held at 650° C. for 4 hours. The light porous product was broken up and screened and the 6–12 mesh material separated. 400 cc. of the 6–12 mesh product was put into the reactor. Gaseous 1,1-difluoroethane was passed through the tube at a rate of 40 g. per hour while the tube was gradually heated. At 230° C., HF fumes appeared in the exit gas, and a sample thereof was fractionally distilled and found to contain 4.3% vinyl fluoride. The temperature was raised to 400° C. and held there, while the flow of 1,1-difluoroethane was continued. Fractional distillation of the product obtained yielded 37.2% of vinyl fluoride and 62.8% of unreacted 1,1-difluoroethane.

*Example 2*

125 grams of $Al_2(SO_4)_3 \cdot 18H_2O$ was dissolved in 100 cc. of water at 90° C. and the solution was poured over 400 cc. of 4–12 mesh activated charcoal while mixing to ensure homogeneous impregnation. The mass was then dried for 4 hours at 250° C. The reactor was charged with 400 cc. of the catalyst. Gaseous 1,1-difluoroethane was passed through the tube at a rate of 35 g. per hour while the tube was slowly heated to 350–360° C., where it was held. A sample of the product was condensed and fractionally distilled to yield 27.8% of vinyl fluoride and 62.7% of unconverted 1,1-difluoroethane.

It will be understood that the preceding examples have been given for illustrative purposes solely and that my invention is not to be limited to the specific embodiments shown therein, but that many variations and modifications can be made therein, within the scope of the general disclosure and without departing from the spirit or scope of my invention. The size of the reactor may be widely varied and other types of reactors may be employed in place thereof. The temperatures, pressures, rates of flow, and the like may be widely varied as indicated in the general description.

From the preceding description and examples, it will be apparent that I have provided a new, improved, and advantageous method for producing high yields of vinyl fluoride by the dehydrofluorination of 1,1-difluoroethane in the presence of a novel catalyst. The catalyst is easy and relatively cheap to manufacture and has a long catalyst life. Therefore, it is apparent that my invention constitutes a valuable contribution to and advance in the art.

I claim:

1. The process which comprises heating a bed of a catalyst consisting essentially of aluminum sulfate to a temperature of from about 250° C. to about 400° C., flowing gaseous 1,1-difluoroethane through such bed at a rate of from about 20 to about 200 volumes of gaseous 1,1-difluoroethane per volume of catalyst per hour while maintaining the bed at a temperature of from about 250° C. to about 400° C., and separating vinyl fluoride from the gaseous mixture leaving the bed.

2. The process which comprises heating a bed of a catalyst consisting essentially of aluminum sulfate to a temperature of from about 250° C. to about 400° C., flowing gaseous 1,1-difluoroethane through such bed at a rate of from about 20 to about 80 volumes of gaseous 1,1-difluoroethane per volume of catalyst per hour while maintaining the bed at a temperature of from about 250° C. to about 400° C., and separating vinyl fluoride from the gaseous mixture leaving the bed.

3. The process which comprises heating a bed of a catalyst consisting essentially of aluminum sulfate to a temperature of from about 250° C. to about 400° C., flowing gaseous 1,1-difluoroethane through such bed at a rate of from about 35 grams to about 40 grams of 1,1-difluoroethane per 400 cc. of catalyst per hour while maintaining the bed at a temperature of from about 250° C. to about 400° C., and separating vinyl fluoride from the gaseous mixture leaving the bed.

4. The process which comprises heating a bed of a catalyst consisting essentially of aluminum sulfate to a temperature of from about 350° C. to about 400° C., flowing gaseous 1,1-difluoroethane through such a bed at a rate of from about 20 to about 200 volumes of gaseous 1,1-difluoroethane per volume of catalyst per hour while maintaining the bed at a temperature of from about 350°

C. to about 400° C., and separating vinyl fluoride from the gaseous mixture leaving the bed.

5. The process which comprises heating a bed of a catalyst consisting essentially of aluminum sulfate to a temperature of from about 350° C. to about 400° C., flowing gaseous 1,1-difluoroethane through such bed at a rate of from about 20 to about 80 volumes of gaseous 1,1-difluoroethane per volume of catalyst per hour while maintaining the bed at a temperature of from about 350° C. to about 400° C., and separating vinyl fluoride from the gaseous mixture leaving the bed.

6. The process which comprises heating a bed of a catalyst consisting essentially of aluminum sulfate to a temperature of from about 350° C. to about 400° C., flowing gaseous 1,1-difluoroethane through such bed at a rate of from about 35 grams to about 40 grams of 1,1-difluoroethane per 400 cc. of catalyst per hour while maintaining the bed at a temperature of from about 350° C. to about 400° C., and separating vinyl fluoride from the gaseous mixture leaving the bed.

No references cited.